Patented May 8, 1934

1,957,892

UNITED STATES PATENT OFFICE 1,957,892

VAT DYESTUFFS OF THE DIBENZOPYRENE-QUINONE SERIES

Max Albert Kunz, Mannheim, Georg Kränzlein, Frankfort-Hoehst-on-the-Main, Karl Koeberle, Ludwigshafen - on - the - Rhine, Martin Corell, Frankfort-Hochst-on-the-Main, Erich Berthold, Ludwigshafen-on-the-Rhine, and Heinrich Vollmann, Frankfort-Hochst-on-the-Main, Germany, assignors to General Aniline Works, Inc., New York, N. Y., a corporation of Delaware No Drawing. Original application April 16, 1929, Serial No. 355,654. Divided and this application August 31, 1932, Serial No. 631,304. In Germany June 30, 1928

9 Claims. (Cl. 260—61)

The present invention relates to new vat dyestuffs of the dibenzopyrenequinone series and a process for their production.

It is already known that halogen can be introduced in 3.4.8.9-dibenzopyrene-5.10-quinone by means of halogens or halogenating agents with or without the aid of halogen transferrers. Some of the halogen derivatives thus obtained are themselves vat dyestuffs and others are valuable intermediate products for the manufacture of dyestuffs. All these products, however, in so far as they are dyestuffs at all, are not very suitable for dyeing purposes in practice, because they dye rather dull shades which, moreover, are not sufficiently fast. It is also known that uniform 1.6-dihalogen-3.4.8.9-dibenzopyrene-5.10-quinones are obtained by treating 1.5-dibenzoyl-2.6-di-hydroxynaphthalene with phosphorus halides. The resulting dyestuffs have dyeing properties similar to those of the unsubstituted 3.4.8.9-dibenzopyrene-5.10-quinone, which, though they are valuable in many respects, do not meet all requirements of practice.

In our copending application Ser. No. 355,654, filed April 16th, 1929, of which this application is a division, we have disclosed that new products, containing halogen and having excellent dyeing properties, are obtained by treating 3.4.8.9-dibenzopyrene-5.10-quinone, which initial material corresponds to the formula

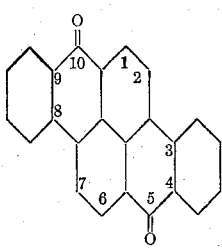

in sulphuric acid or derivatives thereof, such as fuming sulphuric acid and in particular chlorsulphonic acid, with halogens or agents supplying the same in the presence of a halogen transferring catalyst under such conditions of working as to prevent an undue attack of the initial material and the final product. It has been found that these conditions of working depend largely on the temperature employed. The temperature may be the lower, the more reactive the halogen is; therefore, in the case of chlorine, it may be as low as 50° C., whereas in the case of bromine it will usually be about 60° C., and in the case of iodine still higher temperatures, such as 110° C. and more will be necessary. It has also been found that at higher temperatures, say at about 80° C. to 85° C. or more, the 3.4.8.9-dibenzopyrene-5.10-quinone is not entirely resistant to the action of the sulphuric acids employed, these giving rise to the formation of sulphonated products and other by-products impairing the properties of the final product. It is, however, possible to carry out the reaction at such high temperatures, provided it is completed in as short a time as possible, whereby the said action of the sulphuric acids is avoided. With this object in view, either an addition of comparatively large quantities of the halogen-transferring catalyst, such as iodine or sulphur may be made, or the halogen is rapidly introduced into the reaction mixture, or an excess thereof employed, or several of these measures may be used. It results from the foregoing that the most favorable temperature is not higher than about 80° or 85° C. in the case of bromination or chlorination; when working below the said limit, small quantities of the catalyst, for example 0.1 to 0.5 per cent by weight, calculated on the amount of the dibenzopyrene-quinone, are sufficient for the production of products dyeing clear yellow shades; if however, products possessing the most desirable shades and the highest coloring power are to be made, it is advisable to employ considerably larger amounts of the catalyst. Valuable products are also obtained at higher temperatures, in which case one or more of the aforesaid precautions must be taken; for instance, the amount of catalyst employed may be as high as 2, 3, 5 or still much more per cent by weight, calculated on the dibenzopyrenequinone. It will be seen that the conditions of working are mutually interdependent; they must be so restricted as to time or temperatures and so on, that no sulphonation or other undesirable change of the initial materials occurs; for the sake of simplicity of language, we shall therefore speak in the following of "restricted conditions", and it will now be understood what we mean by this term. In order to make the matter still clearer, we shall now explain our method by reference to a typical case, namely the production of dibromo-3.4.8.9-dibenzopyrene-5.10-quinone. When 3.4.8.9-dibenzopyrene-5.10-quinone is dissolved, for example in chlorsulphonic acid, and acted upon with bromine, the reaction may be carried out with 1 to 1.25 molecular proportions of bromine per each molecular proportion of the dibenzopyrene-quinone with the aid of from 2 to 10 per cent of a catalyst, such as iodine, and in the course of only a few hours at temperatures of about 80° C., a dibromated product of highest qualities being obtained. When working at lower temperatures, such as from 60° to 70° C. a larger amount of bromine and a prolonged time of reaction, for example 20 hours or even more, is suitable. At higher temperatures of for example 85° to 100° C. the time of reaction must be reduced to a minimum, and preferably agents counteracting sulphonation, such as iodine or sulphur are added. At still higher temperatures, still more precaution is necessary. Further typical cases of the restricted conditions will be given hereinafter in the examples.

As pointed out in the foregoing, the reaction may be carried out in sulphuric acid or derivatives thereof, such as fuming sulphuric acid and in particular chlorsulphonic acid. When in the claims hereunto appended we speak of "sulphuric acid medium", we wish it to be understood that this term is also to cover solutions in the derivatives of sulphuric acid. It should be noted that chlorsulphonic acid is a particularly good solvent for the purposes of our present invention. When employed at high temperatures, such as about 85° C. or above, chlorination may take place to a smaller or greater extent due to the action of the chlorsulphonic acid.

As regards the catalysts employed in our process, any of the well-known halogen-transferring catalysts may be used for this purpose, but particularly good results are obtained with such catalysts as, for example, iodine, mercury, selenium, sulphur, antimony or bismuth, and of these iodine is the most valuable catalyst. The number of halogen atoms which enter the molecule, depends on the quantity of halogen, but in some cases also the quantity and nature of the catalyst and the nature of the solvent is of importance. This fact becomes particularly evident when working with iodine as a catalyst in chlorsulphonic acid. These two agents in conjunction appear to have oxidizing properties, whereby the hydrogen halide formed during the halogenation is oxidized to free halogen. Accordingly, whereas usually in halogenations one molecule of the halogen is required for each one atom of halogen to be introduced, it may be observed that with the aid of only one molecule of halogen, two halogen atoms are introduced into the dyestuff molecule as mentioned above. In other cases, a slight excess of halogen, for example 1.25 atoms may be required for introducing one halogen atom. In some cases it may be of advantage to employ two or more catalysts simultaneously or consecutively.

According to the present invention, several different halogens may also be introduced into the dibenzopyrene-quinone molecule. For example, we may first chlorinate the initial material, and then introduce bromine into the resulting product. The two operations may also be carried out in the inverse order by first brominating and then chlorinating. Or both operations may be carried out simultaneously.

The chloro-, bromo-, or chlorobromo-3.4.8.9-dibenzopyrene-5.10-quinones thus obtainable dissolve in concentrated sulphuric acid, usually to give solutions of blue or violet color. They form vats which are usually violet or red. They are soluble with great difficulty in organic solvents of high boiling point, such as nitrobenzene, halogenbenzenes, for example mono- or trichlorbenzene, quinoline, nitronaphthalene and the like, and may be purified by crystallization therefrom or by fractional precipitation from their solutions in sulphuric acid by means of water or dilute acid. Generally speaking, the chloro derivatives dye more greenish yellow shades and the corresponding bromo and chlorobromo derivatives considerably more reddish shades than the parent substance.

However, as already indicated above, the present invention is not restricted to the production of such chloro-, bromo- or chlorobromo-3.4.8.9-dibenzopyrene-5.10-quinones, but we may also produce similar iodo-derivatives. For instance, we may introduce iodine into an initial material free from halogen, in which case the resulting products may, if so desired, be further halogenated by treatment with chlorine or bromine or agents supplying the same. Or we may start from 3.4.8.9-dibenzopyrene-5.10-quinones which contain chlorine or bromine or both, and introduce iodine into these compounds. The new products containing iodine possess, generally speaking, very valuable properties like the aforedescribed halogenated dyestuffs. Generally, their solutions in concentrated sulphuric acid and their vats have the same color as those of the abovementioned products, whereas the dyeings of the products containing iodine are of an even more reddish tinge than those of the bromo- and chlorobromo - 3.4.8.9 - dibenzopyrene - 5.10- quinones.

The new products obtainable according to the present invention give dyeings of extraordinary clearness from the vat. Their coloring power is substantially greater, often about twice or even more, than that of the initial material free from halogen and of the known 1.6-dihalogen-3.4.8.9-dibenzopyrene-5.10-quinone; also their properties as regards fastness are much better than those of the said known products; they are particularly distinguished by their excellent fastness to light and to boiling with solutions of soap or soda, and they also possess a very good affinity to vegetable fibre.

Generally speaking, it is of no importance, whether crude or pure 3.4.8.9-dibenzopyrene-5.10-quinone is used as starting material, but it may in some cases be of advantage to employ a pure initial material, because in this case the final products are particularly free from impurities which might cause trouble in their application for dyeing, though as a rule the impurities are insoluble in the vats. Such impurities may, however, also be removed by purifying the products obtained from crude initial material.

The difference between, for example, the known 1.6-dichloro derivative and the dichloro derivatives obtainable according to this invention and also the difference between products obtained according to this invention under different conditions of working are probably due to the different positions of the chlorine atoms; but we do not wish to bind ourselves to this explanation.

The constitution of the new products is not yet known with certainty, whereas the number of halogen atoms contained in the dyestuff molecule is definitely known. For this reason no formulæ of the products are given in the following examples, which will further illustrate the nature of the present invention, but to which examples our invention is not restricted. The parts are by weight.

*Example 1*

33.2 parts of 3.4.8.9-dibenzopyrene-5.10-quinone are dissolved in 332 parts of sulphuric acid monohydrate and heated to about 152° C., whereupon 25.4 parts of iodine are slowly added, while stirring. The said temperature is maintained until the formation of the dyestuff is complete. After cooling, the reaction product is poured onto ice, filtered by suction and the residue is dried. The resulting dyestuff which contains between 1 and 2 atoms of iodine per molecule, is a reddish yellow powder and crystallizes from nitrobenzene in the form of long yellowish red needles. It dissolves in concentrated sulphuric acid with a yellow blue coloration and dyes cotton from a violet vat very clear reddish yellow shades.

*Example 2*

41 parts of monobromo-3.4.8.9-dibenzopyrene-5.10-quinone are dissolved in 400 parts of sulphuric acid monohydrate and are then treated at 150° C. with 25 parts of iodine, while stirring in the manner described in Example 1. The product is worked up in the usual manner. The resulting monoiodo-monobromo-3.4.8.9-dibenzopyrene-5.10-quinone which is in the form of a yellowish red powder, dissolves in concentrated sulphuric acid with a blue coloration with a violet tinge and dyes cotton clear, very fast yellowish red shades from a blue red vat.

What we claim is:—

1. 3.4.8.9 - dibenzopyrene - 5.10 - quinones containing iodine the further positions of which capable of being substituted bearing atoms selected from the class consisting of hydrogen and bromine which dye cotton from violet to red vats bright yellow shades with a substantially more reddish tinge than 3.4.8.9-dibenzopyrene-5.10-quinone, dissolve in concentrated sulphuric acid with a blue to violet coloration, are difficultly soluble in organic solvents of high boiling point, and are distinguished from 3.4.8.9-dibenzopyrene-5.10-quinone by having a substantially greater coloring power and a substantially greater fastness to light and to boiling with solutions of soap and soda.

2. Monobromo - monoiodo - 3.4.8.9 - dibenzopyrene-5.10-quinone which dyes cotton from a blue red vat clear, very fast yellowish red shades, dissolves in concentrated sulphuric acid with a blue coloration with a violet tinge, and is distinguished from 3.4.8.9-dibenzopyrene-5.10- quinone by having a substantially greater coloring power and a substantially greater fastness to light and to boiling with solutions of soap and soda.

3. Iodo - 3.4.8.9 - dibenzopyrene - 5.10 - quinone containing between 1 and 2 atoms of iodine per molecule, which dyes cotton from a violet vat very clear reddish yellow shades, dissolves in concentrated sulphuric acid with a yellow blue coloration, crystallizes from nitrobenzene in the form of long yellowish red needles, and is distinguished from 3.4.8.9-dibenzopyrene-5.10-quinone by having a substantially greater coloring power and a substantially greater fastness to light and to boiling with solutions of soap and soda.

4. The process for the production of vat dyestuffs of the dibenzopyrenequinone series, which comprises acting on 3.4.8.9-dibenzopyrene-5.10-quinone in a sulphuric acid medium with an iodinating agent in the presence of a halogen-transferring catalyst.

5. The process for the production of vat dyestuffs of the dibenzopyrenequinone series, which comprises acting on 3.4.8.9-dibenzopyrene-5.10-quinone in a sulphuric acid medium with iodine.

6. The process for the production of vat dyestuffs of the dibenzopyrenequinone series, which comprises acting on 3.4.8.9-dibenzopyrene-5.10-quinone in a sulphuric acid medium with an iodinating agent at between about 80° and about 150° C.

7. The process for the production of vat dyestuffs of the dibenzopyrenequinone series, which comprises acting on 3.4.8.9-dibenzopyrene-5.10-quinone in fuming sulphuric acid with an iodinating agent at between about 80° and about 150° C.

8. The process for the production of a vat dyestuff of the dibenzopyrenequinone series, which comprises acting on 3.4.8.9-dibenzopyrene-5.10-quinone in sulphuric acid monohydrate with iodine at about 150° C.

9. The process for the production of a vat dyestuff of the dibenzopyrenequinone series, which comprises acting on monobromo 3.4.8.9-dibenzopyrene-5.10-quinone in sulphuric acid monohydrate with iodine at about 150° C.

MAX ALBERT KUNZ.
GEORG KRÄNZLEIN.
KARL KOEBERLE.
MARTIN CÖRELL.
ERICH BERTHOLD.
HEINRICH VOLLMANN.